(12) United States Patent
Cheng

(10) Patent No.: US 7,170,502 B2
(45) Date of Patent: Jan. 30, 2007

(54) METHOD FOR IMPLEMENTING A PARTIAL INK LAYER FOR A PEN-BASED COMPUTING DEVICE

(75) Inventor: Brett Anthony Cheng, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 815 days.

(21) Appl. No.: 10/407,596

(22) Filed: Apr. 4, 2003

(65) Prior Publication Data
US 2004/0196255 A1    Oct. 7, 2004

(51) Int. Cl.
G09G 5/00    (2006.01)
(52) U.S. Cl. ...................... 345/173; 345/156
(58) Field of Classification Search ........ 345/173–179, 345/156; 178/18.01–19.01
See application file for complete search history.

(56) References Cited

U.S. PATENT DOCUMENTS

| 5,732,152 | A | 3/1998 | Sakai et al. |
| 5,881,169 | A | 3/1999 | Henry, Jr. |
| 6,212,297 | B1 | 4/2001 | Sklarew |
| 6,788,294 | B2* | 9/2004 | Takala et al. ............... 345/173 |
| 6,842,170 | B1* | 1/2005 | Akins et al. ............... 345/173 |
| 2003/0197688 | A1* | 10/2003 | Aufderheide et al. ....... 345/173 |

* cited by examiner

Primary Examiner—Ricardo Osorio
(74) Attorney, Agent, or Firm—Mark P. Watson

(57) ABSTRACT

A method for creating an ink-trail and implementing a partial ink layer in a pen based computing apparatus is described. The partial ink layer, which is smaller than a display window of a computing apparatus, is located at a starting address with a shape and size that fits within the display widow. An ink trail is created within the ink layer that simulates ink flowing from the pen to paper while a character, or several cursive characters, is formed by the pen while touching a touch screen overlaying the display screen of the computing apparatus. The ink trail is erased when the pen is removed from the touch screen. The bit depth of the pixels in the partial ink layer are less than for the pixels of the main display and can be as few as 2, which includes a transparency bit.

38 Claims, 4 Drawing Sheets

METHOD FOR IMPLEMENTING A PARTIAL INK LAYER FOR A PEN-BASED COMPUTING DEVICE

BACKGROUND OF THE INVENTION

1. Field of Invention

Figure 1:
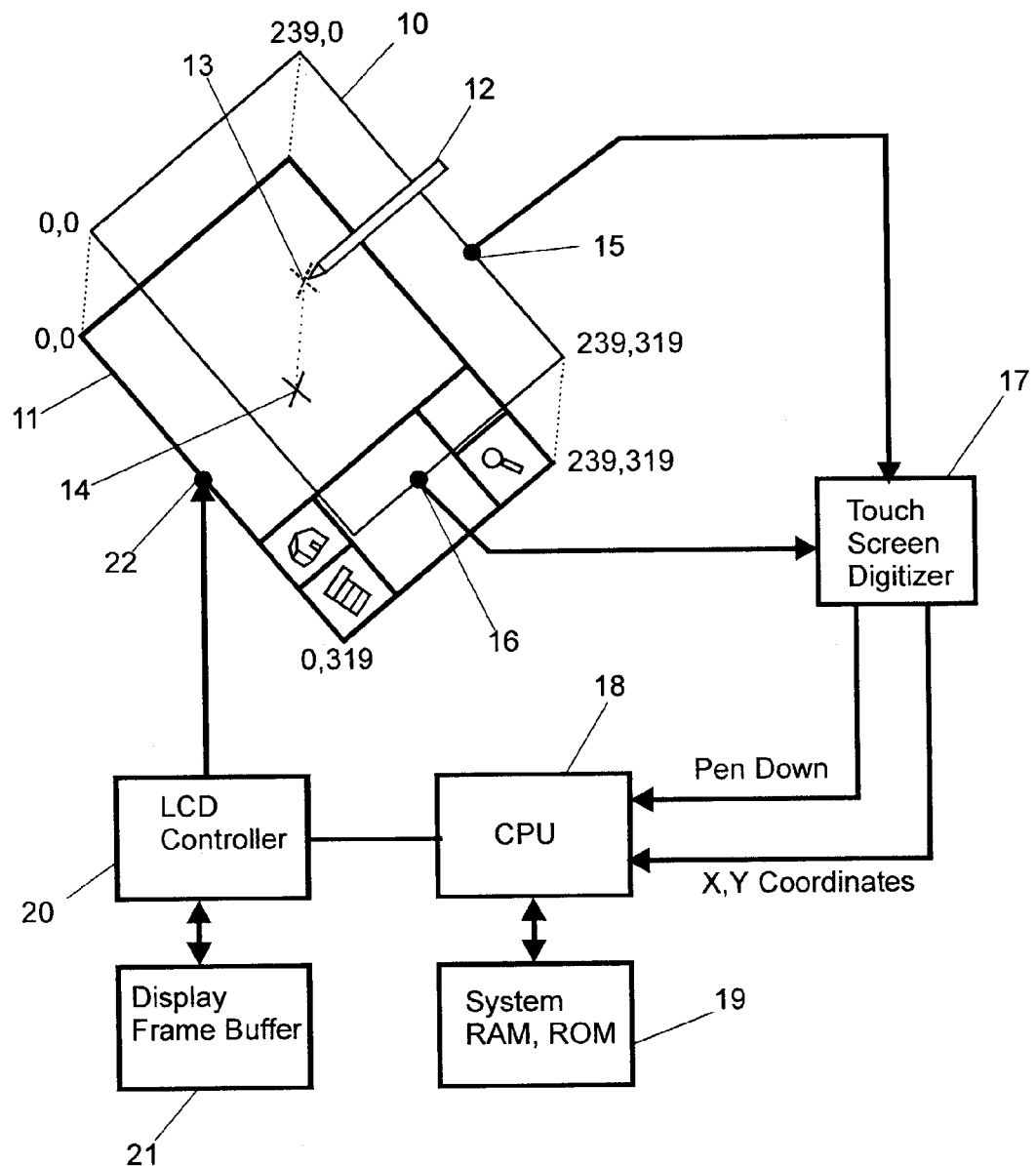

The present invention relates a pen-based computing device and in particular to the use of a partial ink layer.

2. Description of Related Art

A pen-based device, such as a PDA (personal data assistant) or a tablet based computer, uses an LCD display overlaid by a transparent touch screen. Other devices, such as smart phones or other intelligent devices, are becoming available and may use small displays and pen-base input. The touch screen is used to input the location of a pen, or stylus, when the pen touches the surface of the touch screen. When the pen comes in contact with the touch screen, the CPU contained within the PDA interprets the X and Y coordinates of the location of the pen and performs operations depending on where the pen is located. A PDA like device uses several methods of data input, clicking on "soft" buttons or icons on the display screen, handwriting recognition, and text input using the pen on the touch screen. Handwriting can be character based by entering one character at a time or more fully cursive where full words or phrases are entered at one time.

U.S. Pat. No. 6,212,297 B1 (Sklarew) is directed to a keyboard-less entry computer system, where a part of the computer screen is allocated to handwriting symbols while another part of the screen displays font symbols. In U.S. Pat. No. 5,881,169 (Henry, Jr.) a method and apparatus is directed to handwritten data entry into a computing device, where the display screen displays pen strokes in the character input area. U.S. Pat. No. 5,732,152 (Sakai et al.) is directed to a method and apparatus for handwritten data entry onto a display of a computer device. When characters are written into an area on the display, they are recognized by the device and drawn in the data entry area and also in a non-data entry area.

The most popular PDA devices use a character-based form of data entry known Grafitti™. The Grafitti alphabet uses a simplified shorthand version of letters and numbers that are intended to simplify the task of character recognition by the PDA device. In general the Grafitti characters comprise single simplified and unique strokes by the pen touching the touch screen. The user of the PDA learns the simplified alphabet, which allows the PDA to have an easier task interpreting the user input. This is quite important on a hand held device, which may have a low performance CPU to minimize power consumption and device cost.

It has been shown that handwriting recognition improves if the user has a visual feedback of the characters that he or she are writing. Therefore, it is desirable to display a pen trail or digital ink on the display screen as the user writes a character for input. The pen trail is temporary and after the user finishes the character stroke or a full cursive input, the "ink" disappears. Thus the "ink" is thought of as overlaying the main display image, and the system erases or hides the ink-layer when the input is complete.

If a pen trail were written to frame buffer memory, it would overwrite any pixel data lying "below" the ink; therefore, in order to not destroy the original displayed image, the system CPU may need to first save the underlying regular display image before writing the "ink". The original image would need to be restored after the "ink" was erased. In order to save the original image (or perhaps just the portion that will be overwritten by ink), it must be stored somewhere else, either in off screen memory or perhaps elsewhere in free space in the system main memory. Assuming that sufficient memory space is available to store the original image, there will be an amount of time to store and retrieve the original image that can affect system performance.

Because the display of the "ink" is only momentary, it is desirable to save the memory space and code execution time that is necessary to save the underlying regular display image and then restore it later. The basic concept is to not disturb the main displayed image in the frame buffer, but instead to store the "ink" pixels in a separate area of memory, and have the display controller fetch pixels from either the display frame buffer or ink layer pixel storage, and display the appropriate pixel on the display. In this way, the original image is not actually overwritten in the frame buffer and need not be saved and restored. In the prior art, such an ink layer would be of the same dimensions as the whole main display image.

There are two distinct concepts to store the "ink" pixels and not disturb the main display. The first is a separate "Ink layer" in which to store the ink image pixels. This would consist of a separate area of memory to store the ink pixels. In addition, the ink pixels are treated differently than main display image pixels, in that ink layer pixels are either transparent (show the main image pixel below the ink layer rather than the ink pixel), or visible (show the ink pixel, and "obscure" or don't show the main image pixel below it). The second is a separate "overlay" layer, which like the ink layer stores pixels in a separate area of memory. Unlike an ink layer however, an overlay does not include a transparency feature. The overlay pixels act and behave like regular main display image pixels. Depending on whether or not the overlay is to be displayed at a particular location on the screen, the LCD controller basically either chooses pixels from the main image memory, or the overlay image memory and displays them at that point on the display. But like the ink layer, changing pixels in the overlay leaves main image pixels in the frame buffer undisturbed. The important difference is that the overlay is opaque, obscuring the whole main image below it.

For an ink layer, whether or not to show the underlying main image or the ink pixel must be determined on a pixel-by-pixel basis by examining the transparency bit. This means that for each pixel location on the screen, the LCD controller must fetch two pixels, one from main image frame buffer, and another from the ink layer. Only after that will one or the other pixel be output to the display since the transparency bit for each pixel effectively gates which pixel (main or ink) gets routed to the display. For an overlay, the presence of the overlay on top of the main image is predetermined by designating the starting address and the size of the overlay. Therefore, the display controller fetches the overlay pixels only when the point where the overlay begins and does not fetch the main image pixels again until a point on the screen where the overlay ends. The effect of allowing for a transparency bit results in a higher bandwidth required to draw the same amount of pixel locations on the display from frame buffer memory for an ink layer as compared to an overlay.

SUMMARY OF THE INVENTION

It is an objective of the present invention to provide a partial ink-layer, which provides ink-layer functionality only over a portion of a computing apparatus display screen.

It is also an objective of the present invention to provide a real time ink trail in a partial ink-layer of a computing apparatus using a pen in contact with a touch screen to enter characters.

It is another objective of the present invention to locate the partial ink layer of a predetermined shape at a starting address.

It is also another objective of the present invention to erase the ink trail after entry of characters by the pen contacting the touch screen.

It is also a further objective of the present invention to provide a partial ink layer over a portion of the display screen for a PDA.

It is yet a further objective of the present invention to provide the partial ink layer to reduce memory requirements for storage of ink layer pixels.

It is yet another objective of the present invention to reduce the memory fetches required to support the main screen and the ink layer.

It is yet still another objective of the present invention to allow the partial ink layer to be either in a fixed location or locatable by the user.

It is still another objective of the present invention to display an ink trail on the partial ink layer beneath the tip of the writing stylus.

It is still another objective of the present invention to locate the ink trail at location not immediately beneath the tip of the stylus.

It is also still another objective of the present invention to use an ink trail for character entry into the PDA.

It is also yet another objective of the present invention to erase the ink trail after each entry.

In the present invention a computing apparatus has a display screen overlaid by a touch screen, which is used for data entry. A pen or a stylus is used in contact with the touch screen to input text and numbers in the form of cursive characters where the number of characters ranges from one to several characters forming word and phrases. A partial ink-layer, which is smaller than a display screen, is formed over a portion of the display screen. The partial ink-layer is used to display a real time ink trail, which simulates ink flowing from the pen, or stylus, onto a paper to form the characters being written. The ink trail is erased upon completion of the cursive characters. The bit depth (the number of bits per pixel) of each pixel in the ink-layer is less that needed for the display screen and can be a low as one or two bits.

The partial ink layer is located by software using a starting address and a shape. The location of the ink-layer can be directly below the pen to show the ink trail of at some other location on the display screen not directly under the pen. Although, the partial ink-layer is intended to save memory by not covering the entire display screen, the partial ink layer can be set up to cover the entire region of the display screen. Storage of digitized characters representing the cursive characters that are inputted by touching the touch screen with the pen can be done in the partial ink-layer overlaying a particular location on the display screen.

Whereas, the present invention applies to hand held computing apparatus such as a PDA (personal data assistant), the present invention also applies to other computing apparatus having a touch screen and receiving input from the contact of a pen or stylus on the touch screen.

BREIF DESCRIPTION OF THE DRAWINGS

Figure 2:
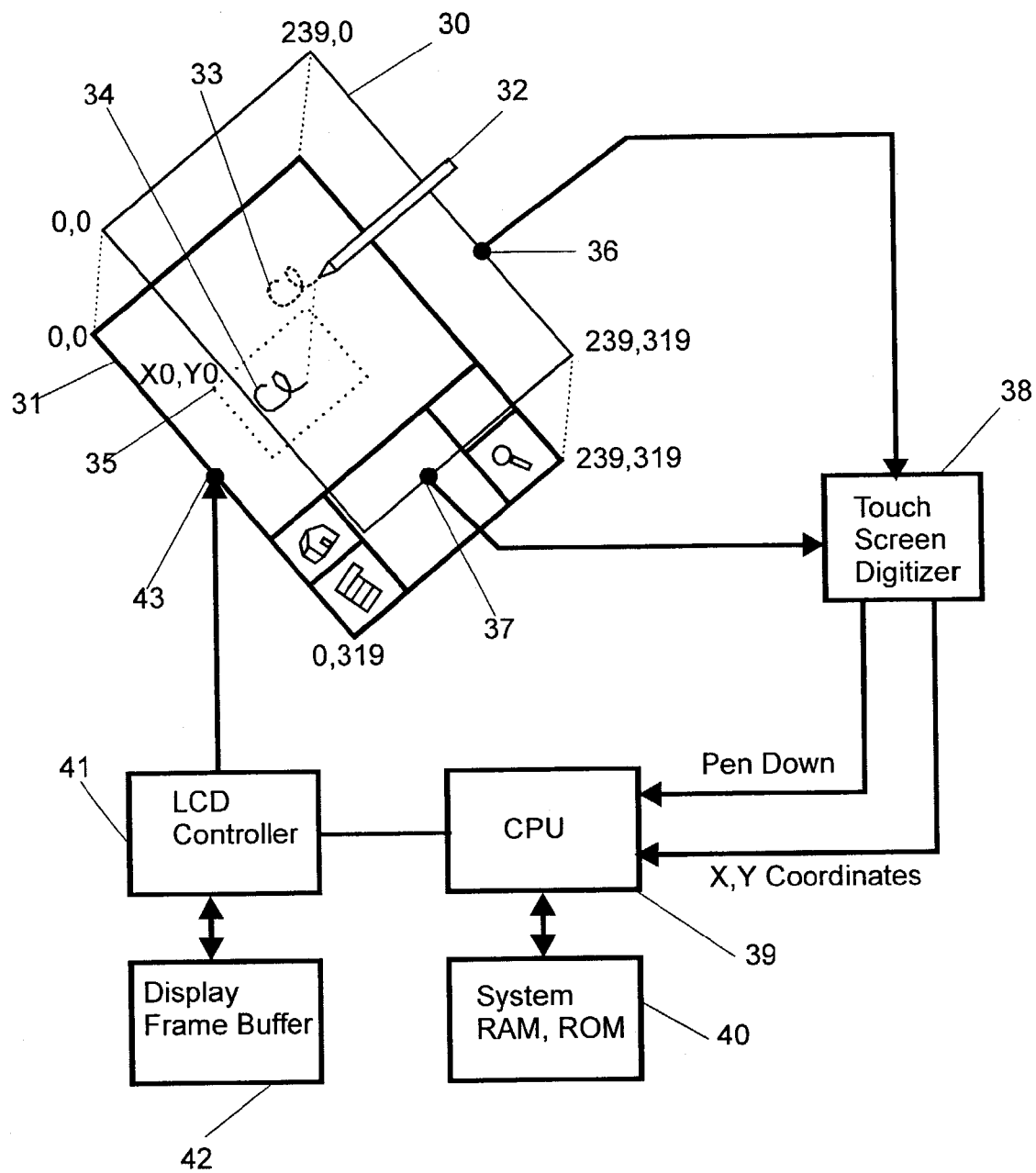
Figure 3:
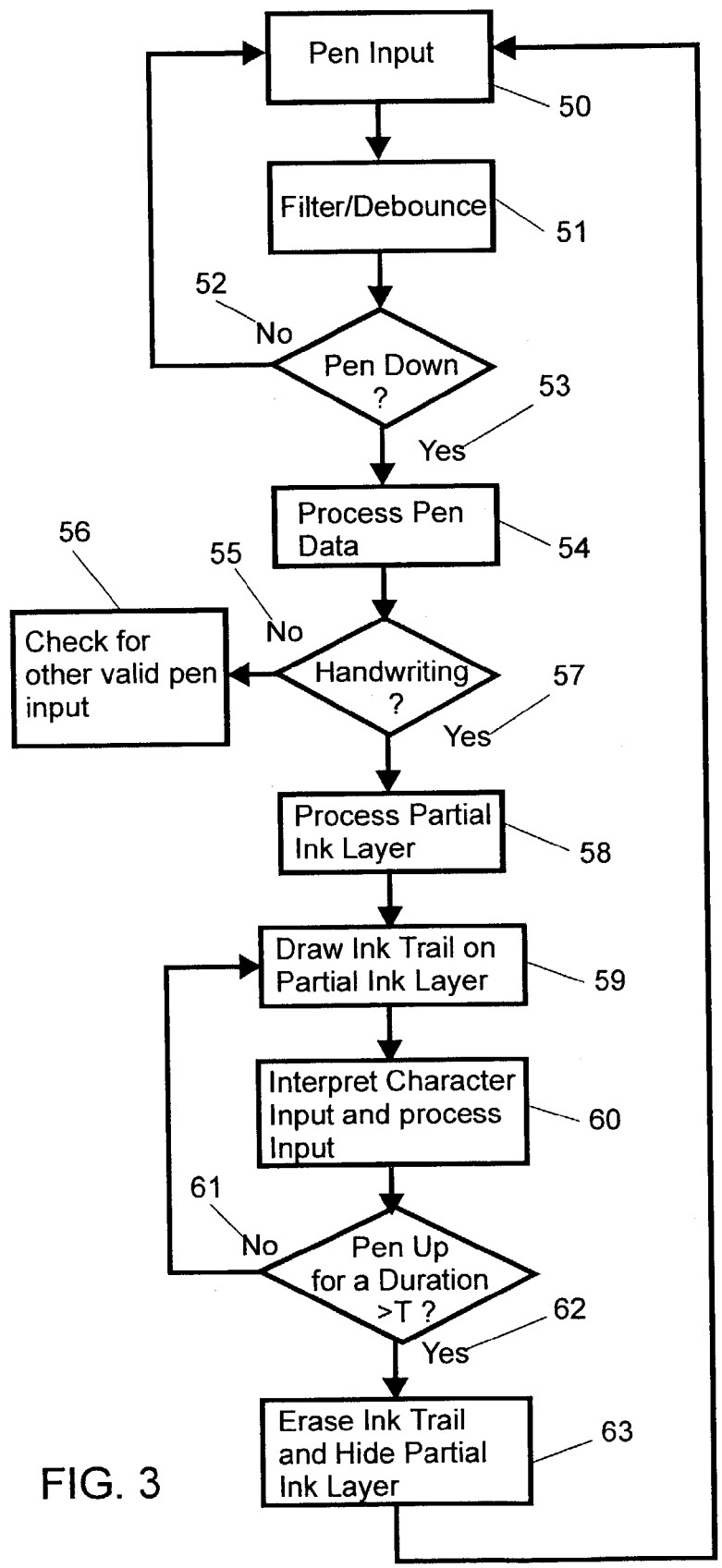
Figure 4:
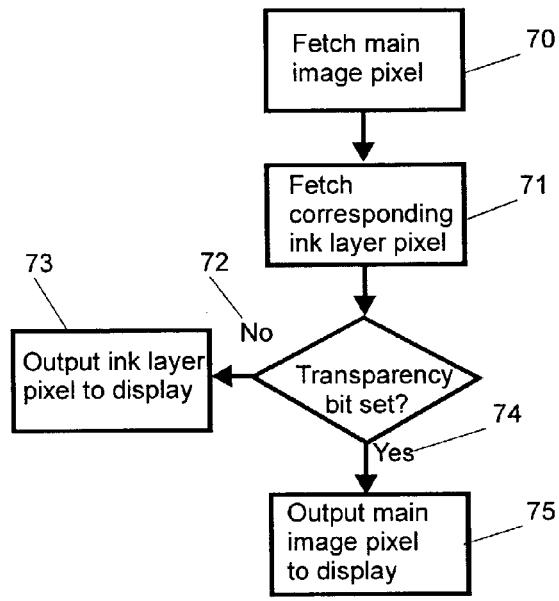
Figure 5:
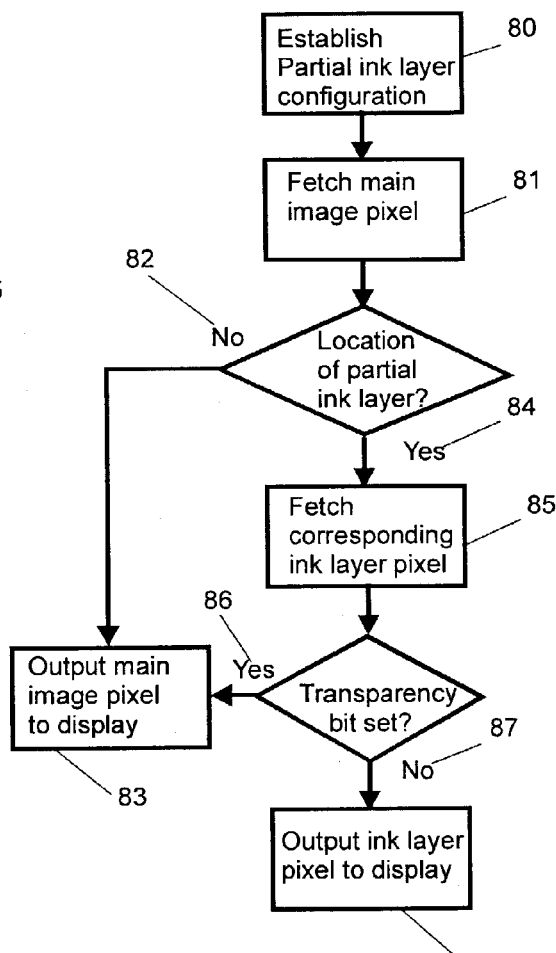

This invention will be described with reference to the accompanying drawings, wherein:

FIG. 1 shows a block diagram of the computing apparatus of prior art with a full ink-layer, FIG. 2 shows a block diagram of the computing apparatus of the present invention with a partial ink-layer, FIG. 3 shows a flow diagram for drawing an ink trail in the partial ink layer of the present invention, FIG. 4 shows a flow diagram for selecting an ink-layer pixel or a main display image pixel of prior art, and FIG. 5 shows a flow diagram for selecting an partial ink-layer pixel or a main display image pixel of the present invention.

DETAILED DESCRIPTION OF THE PREFERRED EMBODIMENT

In FIG. 1 is shown a computing apparatus of prior art such as a hand held PDA. A touch screen 10 overlays a display screen 11, and a touching device 12 (such as a stylus, pen, pointer, finger or other object capable of creating a coherent combination of characters when in contact with said touch screen) is used to trace a character 13 on the touch screen that is displayed 14 on the main screen 11. The touch screen 10 and the display screen 11 have the same shape and dimensions starting with pixel position 0,0 and ending with pixel position 239,319. The X (15) and Y (16) coordinate position of the pen 12 touching the touch screen 10 is coupled to the touch screen digitizer 17. The touch screen digitizer 17 couples a "pen down" signal and digitized X,Y coordinates to the CPU 18, which in turn couples the pen location to the LCD controller 20. The CPU 18 stores the operating system and other programs in the system RAM and ROM 19. The LCD controller 20 stores the image of the display screen in the display frame buffer 21, and communicates to the display screen 22 to form the ink trail 14 that is to be displayed on the main screen 11. An ink-layer, if it exists, is the same size as the display screen 11 and could display the character 14 created by the pen 12 touching the touch screen 10.

FIG. 2 is shows a computing apparatus of the present invention. A touch screen 30 overlays a display screen 31, and a touching device 32 is used to trace a cursive combination of characters 33 of one or more characters on the touch screen 30 from which is displayed as an ink trail 34 on a partial ink layer 35 contained within the main screen 31. The ink trail 34 in the partial ink-layer is formed from pixels with a bit depth (number of bits per pixel) that is much less that the bit depth of the pixels on the display screen. A minimum of two bit per pixel allows one bit for transparency with respect to the display screen and one bit for the ink trail 34. The cursive combination of characters can range from the single character like Grafitti™ of a PDA to several characters making up a word or several words into a phrase or a partial phrase. The display of an ink trail 34 simulates ink flowing from a pen onto paper when one write a character, word or phrase.

The touch screen 30 and the display screen 31 have the same shape and dimensions starting with pixel position 0,0 and ending with pixel position 239,319, but the partial ink-layer 35 has a size which is less than that of the display screen 31 with a starting pixel location of X0,Y0. In the maximum case the partial ink layer 35 is the same shape and dimension as the display screen 31. The software contained within the computing apparatus locates the partial ink-layer using the starting address and a shape, and the position and shape of the ink layer is re-locatable using the software of the computing device. The X (36) and Y (37) coordinate position of the pen 32 touching the touch screen 30 is coupled to the touch screen digitizer 38. The ink trail 34 and the partial ink-layer 35 may or may not be directly below the location of contact of the pen 32 to the touch screen 30.

The touch screen digitizer 38 couples a "pen down" signal and digitized X,Y coordinates of the pen location to the CPU 39, which in turn couples the pen location to the LCD controller 41. The CPU 39 and the LCD controller 41 can be formed by a plurality of separate integrated circuit devices, or combined to form a part of an integrated circuit controller. The CPU 39 stores the operating system and other programs in the system RAM and ROM 40. The LCD controller 41 stores the image of the display screen 31 in the display frame buffer 42 along with the ink trail 34 in a separate storage region, and communicates to the display screen 43 to form the real time image of the ink trail 34 that is to be displayed in the partial ink-layer 35 located on the main screen 31. When the pen 32 is lifted from the touch screen 30, the ink trail 34 is erased. The digital characters created from the input from the pen by forming the cursive combination of characters is stored on the display screen and may be stored in the ink-layer to use available memory space.

FIG. 3 shows a flow diagram of the present invention. A pen input 50 is filtered to smooth out any noise such as bounce 51. If the pen is not in contact with the touch screen 52, the computing apparatus returns to wait for a pen input 50. If the pen is down 53 (in contact with the touch screen), then the data inputted by the pen is processed 54. If the pen data is not handwriting 55, such as selecting a screen button, then the pen input is checked for validity 56. If the pen input is of a hand writing nature 57, then the partial ink layer is processed 58 to set up the partial ink layer for creating an ink trail, and, an ink trail emanating from the pen in contact with the touch screen is created in the partial ink layer 59. The character input from the pen is interpreted and processed to created a digital representation of the character 60. If the touching device is not lifted form the touch screen 61, then the ink trail is continued to be drawn 59. If the pen is lifted from the touch screen for longer than a predetermined time T 62, the pen trail is erased and the partial ink layer is hidden 63 and the process returns to waiting for a pen input 50. The waiting for a predetermined time T to elapse before concluding the pen is up 62, allows multi-stroke characters to be formed before the computing apparatus interprets that a single stroke character was formed.

FIG. 4 shows a method of prior art to control the fetching and outputting of the main image pixel and the ink layer pixel for the main display screen. The ink layer in this case is full screen making it the same size as the display screen. A main image pixel is fetched 70, and the corresponding ink layer pixel is fetched 71. If the transparency bit of the ink layer pixel is not set 72, the ink layer pixel is outputted to the display screen 73. If the transparency bit of the ink layer pixel is set 74, the min image pixel is outputted to the display 75.

In FIG. 5 is shown a method of controlling and displaying the pixels of a main image and a partial ink layer of the present invention. The partial ink layer is established (shape and location on the display) 80, and the main image pixel is fetched 81. If the location of the main image pixel does not coincide with the partial ink layer 82, the main image is outputted to the display 83. If the location of the main image coincides with the partial ink layer 84, the corresponding ink layer pixel is fetched 85. If the transparency bit of the fetched ink layer pixel is set 86, the main image pixel is outputted to the display 83. If the transparency bit of the fetched ink layer pixel is not set 87, the ink layer pixel is outputted to the display.

While the invention has been particularly shown and described with reference to preferred embodiments thereof, it will be understood by those skilled in the art that various changes in form and details may be made without departing from the spirit and scope of the invention.

What is claimed is:

1. A method of writing to a computing device using a touching device for data entry, comprising:
    a) locating a partial ink-layer over a region of an LCD display screen,
    b) forming a cursive combination of characters by contacting a transparent touch screen located over said LCD screen with a touching device,
    c) displaying an ink trail of said touching device in said partial ink layer as said touching device forms said cursive combination of characters,
    e) storing a digital representation of said cursive combination of characters,
    f) erasing said ink trail after said touching device forms said cursive combination of characters.

2. The method of claim 1, wherein said touching device is any device capable of forming a coherent combination of characters when in contact with said touch screen.

3. The method of claim 2, wherein said touching device is a stylus, pen or finger.

4. The method of claim 1, wherein said cursive combination of characters is a single character.

5. The method of claim 1, wherein said cursive combination of characters is a word or a combination of words.

6. The method of claim 1, wherein forming a cursive combination of characters is by contacting said transparent touch screen with a touching device.

7. The method of claim 1, wherein said region is smaller in size than said display screen.

8. The method of claim 1, wherein said region covers an entire area of said display screen.

9. The method of claim 1, wherein locating a partial ink-layer is by software using a starting address and a shape.

10. The method of claim 1, wherein displaying said ink trail is in real time and simulates ink flowing from a pen to a paper.

11. The method of claim 1, wherein displaying said ink trail in said partial ink-layer comprises pixels at a bit depth of less than said pixels on the display screen.

12. The method of claim 1, wherein storing a digital representation of said cursive combination of characters is done in said partial ink layer.

13. A computing apparatus with means to write to a partial ink-layer, comprising;
    a) a means for locating and configuring a partial ink-layer within an area of a portion of a display of a computing device,
    b) a means for inputting a cursive combination of characters using a touching device and a touch screen of said computing device,
    c) a means for displaying an ink trail of said touching device in said partial ink-layer while inputting said cursive combination of characters, d) a means for erasing said ink trail of said touching device from said partial ink-layer upon completion of said cursive combination of characters.

14. The computing apparatus of claim 13, wherein the means for locating and configuring said partial ink-layer uses a starting address and a shape.

15. The computing apparatus of claim 13, wherein said partial ink-layer covers an entire area of said display.

16. The computing apparatus of claim 13, wherein said partial ink-layer is turned on or off by software and is not needed for all operations.

17. The computing apparatus of claim 13, wherein said cursive combination of characters is one character.

18. The computing apparatus of claim 13, wherein said cursive combination of characters is a word or a combination of words.

19. The computing apparatus of claim 13, wherein said means for inputting said cursive combination of characters uses any device capable of forming a coherent combination of characters when in contact with said touch screen.

20. The computing apparatus of claim 19, wherein said touching device is a stylus, pen or finger.

21. The computing apparatus of claim 13, wherein said means for displaying said ink trail is in real time and displays a movement of said touching device thereby simulating ink from a pen onto paper.

22. The computing apparatus of claim 13, wherein said means for displaying said ink trail in said partial ink-layer uses fewer bits per pixel than used in the main display.

23. A computing apparatus with a pen-based data entry, comprising:
  a) a controller
  b) an LCD display,
  c) a transparent touch screen,
  d) a touching device for data entry,
  e) a partial ink-layer covering a display portion smaller than said LCD display,
  f) said partial ink-layer displays an ink trail of said pen during data entry.

24. The computing apparatus of claim 23, wherein said controller further comprises:
  a) a touch screen digitizer,
  b) a central processing unit,.
  c) an LCD controller.

25. The computing apparatus of claim 24, wherein said touch screen digitizer converts location information of said touching device in contact with said touch screen into digital data to be processed by said central processing unit.

26. The computing apparatus of claim 24, wherein said central processing unit interprets which character or cursive combination of characters are being formed by the touching device in contact with the touch screen.

27. The computing apparatus of claim 24, wherein said central processing unit determines a size of the partial ink layer and when to expand said size as a character or a cursive combination of characters is formed by the touching device.

28. The computing apparatus of claim 24, wherein said LCD controller controls formation and expansion of the partial ink layer and draws the ink trail that follows a movement of the touching device.

29. The computing apparatus of claim 23, wherein said touching device is any device capable of forming a coherent combination of characters when in contact with said touch screen.

30. The computing apparatus of claim 29, wherein said touching device is a stylus, pen or finger.

31. The computing apparatus of claim 23, wherein said partial ink-layer is a full ink-layer covering an entirety of said LCD display.

32. The computing apparatus of claim 23, wherein said partial ink-layer is re-locatable over the surface of the LCD display.

33. The computing apparatus of claim 23, wherein said partial ink layer is turned on or off by software.

34. The computing apparatus of claim 23, wherein said ink trail displays a movement in real time of said touching device and thereby simulating ink from a pen onto a paper.

35. The computing apparatus of claim 23, wherein said ink trail is erased upon ending of said data entry by a user, wherein said data entry is a character or a cursive combination of characters.

36. The computing apparatus of claim 35, wherein said data entry ends when said touching device is lifted from said touch screen.

37. The computing apparatus-of claim 23, wherein a bit-depth for a pixel in said partial ink layer is different than said bit-depth for said pixel in said main display.

38. The computing apparatus of claim 23, wherein said bit depth for a pixel in said partial ink layer is less than said bit depth for said pixel in said main display.

* * * * *